United States Patent [19]

Robinson et al.

[11] Patent Number: 5,458,744

[45] Date of Patent: Oct. 17, 1995

[54] PROCESS TO PRODUCE HYDROGEN AND/OR HEMIHYDRATE CALCIUM SULPHATE FROM CALCIUM SULPHITE

[75] Inventors: Murry C. Robinson, Don Mills; Donald W. Kirk, Bolton; Richard L. Hummel, Toronto, all of Canada

[73] Assignee: Materials-Concepts-Research Limited, Don Mills, Canada

[21] Appl. No.: 946,433

[22] Filed: Aug. 18, 1993

[30] Foreign Application Priority Data

May 14, 1990 [GB] United Kingdom ............... 9010745
Jun. 19, 1990 [GB] United Kingdom ............... 9013649

[51] Int. Cl.$^6$ .................... C25B 1/22; C01F 11/46
[52] U.S. Cl. .................... 204/104; 423/166; 423/243.08; 423/243.09; 423/555; 204/129
[58] Field of Search .................... 204/104, 129; 423/555, 243.08, 243.09, 166

[56] References Cited

U.S. PATENT DOCUMENTS 3,556,722  1/1971  Owaki .
4,069,300  1/1978  Akazawa ................... 423/555
4,976,936  12/1990  Rathi ................... 423/242

FOREIGN PATENT DOCUMENTS 1467292  10/1970  Germany .
52-10793  3/1977  Japan .

Primary Examiner—Kathryn Gorgos
Assistant Examiner—Brendan Mee
Attorney, Agent, or Firm—Rogers & Milne

[57] ABSTRACT

A process for producing hydrogen and/or hemihydrate calcium sulphate from calcium sulphite. Waste solid containing calcium sulphite and other calcium salts is treated by the addition of aqueous sulphur dioxide solution or sulphuric acid solution to produce a liquid phase product. The liquid phase product may be separated from any remaining solid phase material and then subjected to the addition of sulphuric acid in a second step, wherein calcium sulphate hemihydrate is produced. The addition of sulphuric acid to the liquid phase results in the evolution of sulphur dioxide which may be used as such or in sulphur dioxide electrolysis cells in order to produce hydrogen and sulphuric acid. An especially unique feature of the process is that the sulphuric acid produced in generating hydrogen can be recycled to the step where the calcium sulphate crystals are produced.

19 Claims, 2 Drawing Sheets

OVERALL EQUATION:

$$CaSO_3 \cdot 2H_2O \longrightarrow CaSO_4 \cdot \tfrac{1}{2} H_2O + \tfrac{1}{2} H_2O + H_2$$

EQUATION:

CHEMICAL CONVERSION –
$$CaSO_3 \cdot 2H_2O + H_2SO_4 \longrightarrow CaSO_4 \cdot \tfrac{1}{2} H_2O + 2\tfrac{1}{2} H_2O + SO_2$$

ELECTROLYSIS –
$$SO_2 + 2H_2O \longrightarrow H_2SO_4 + H_2$$

PROCESS TO PRODUCE HYDROGEN AND/OR HEMIHYDRATE CALCIUM SULPHATE FROM CALCIUM SULPHITE

FIELD OF THE INVENTION

This invention relates to a process to produce hydrogen and calcium sulphate hemihydrate and, in particular, this invention relates to a two-stage process for treating calcium sulphite, which may be obtained from waste solids produced in commercial dual alkali flue gas desulphurization operations to obtain hydrogen and calcium sulphate hemihydrate. The invention also relates to the co-production of sulphur dioxide and calcium sulphate hemihydrate from similar source materials.

BACKGROUND OF THE INVENTION

This invention is beneficial to the world by the use of waste products from flue gas desulphurization processing in order to produce valuable products, namely hydrogen, high quality products for special plasters applications and/or sulphur dioxide. In so doing, the cost of reducing acid rain and carbon dioxide emissions may be substantially reduced both directly and indirectly. Details in this regard are provided in the following paragraphs.

The world, in general, is becoming far more concerned not only about earthbound pollutants but also atmospheric pollutants, and in particular sulphur dioxide, carbon dioxide and chlorofluorocarbons. This relates to how it will affect us as well as the young and future generations.

Sulphur dioxide emissions result in much of the acid rain which not only damages lakes and vegetation but is making the soil more and more acidic. According to one article, more than half or Europe's soil will be excessively acid in 50 years' time if the continent does not upgrade programs.

Carbon dioxide emissions are believed to be the key factor in the greenhouse effect which is gradually causing earth warming and, if these continue to accelerate at current high rates, could result in melting of the polar ice caps, thus raising ocean levels to harmful degrees and also resulting in wide areas of drought throughout the world.

Chlorofluorocarbon emissions are affecting the ozone layer surrounding the earth, and this results in excess ultraviolet rays from the sun reaching the earth's surfaces.

The vast portion of these emissions are generated by the more advanced industrialized nations, but have a worldwide effect.

Sulphur dioxide and carbon dioxide emissions might be somewhat reduced by the production of more nuclear generated electrical power but therein lies perhaps greater risks to the atmosphere as experienced at Chernobyl, U.S.S.R. and Three Mile Island, U.S.A.

More stringent environmental regulations in North America and presumably Europe are leading to greater $SO_2$ emissions control regulations. This is leading to the installation of more and more sulphur dioxide emission control installations. Also, $CO_2$ emission control standards are currently aimed at maintaining $CO_2$ emissions at the same level at the end of this decade as at its beginning. If ignored, these goals could be followed by the imposition of stiff penalty charges for firms not complying with standards imposed.

In view of these pollution problems, it is preferred to have an economical process for the production of hydrogen and other valuable by-products which would result in lower sulphur dioxide and carbon dioxide emissions, as well as eliminating a solid waste disposal problem.

Although our invention will not result in chlorofluorocarbon emissions benefits, it is expected to result in substantially improved commercial practices, not only for the restriction of earthbound pollution resulting from undesirable waste products and more importantly, for improved economical control of sulphur dioxide and carbon dioxide emissions.

Present practices endeavour to use expensive low sulphur coal for coal burning in utility electrical power stations whereas our invention should encourage the use of less expensive higher sulphur coal, thus obtaining energy both from the burning of the sulphurous material as well as from its hydrocarbon content, thus less carbon dioxide would be emitted per unit of electrical energy. Also the production of hydrogen from water would reduce carbon dioxide emissions as opposed to the production of hydrogen from natural gas which results in the production of about eleven pounds of carbon dioxide per pound of hydrogen.

With regard to sulphur dioxide emissions, it is planned to use the sulphur containing waste products from flue gas desulphurization in the production of valuable chemicals rather than being a negative value environmental problem and should result in the greater utilization of commercialized flue gas desulphurization systems which produce the type of waste products most suited for feed materials to our novel process.

Various processes have been developed to convert sulphite salts from flue gas scrubbing solids using air. Pursuant to these processes, sulphur dioxide is not recovered and hence hydrogen production is not possible. Further, some of these such processes result in the incomplete conversion of the sulphite portion. This may arise because insoluble calcium sulphate forms on the surface of the solids and prevents complete reaction. In order to overcome this problem, strong acids such as hydrochloric acid and nitric acid may be used. However, strong acids do not produce the corresponding sulphate. German Patent (Ger. Offen. DE 3,722,995 Jan. 1989) discloses the use of dilute sulphuric or nitric acid to treat flue gas scrubbing residues and collect evolved sulphur dioxide. According to this process, the calcium sulphate remains as the solid phase with the insoluble flyash contaminants and inhibits the complete utilization of sulphite salts. Further, substitution of nitric acid for sulphuric acid would reduce the recovery of sulphur dioxide since nitric acid is an oxidizing acid.

An object of this invention is to produce hydrogen when and as required for a variety of applications such as in power generation, steel making, other metallurgical operations, petroleum or petrochemical operations, fertilizer production, chemical synthesis and a host of other operations. Within this invention, sulphur dioxide is produced and may be used as a low energy hydrogen source. Although the sulphur dioxide may be completely utilized for hydrogen production, sulphur dioxide also has many industrial uses and may be drawn from the process as desired.

Another object of this invention is to produce calcium sulphate hemihydrate as a by-product. This is a valuable replacement for natural gypsum for special plasters, wallboard, cement and other manufacturing purposes.

A further object of this invention is the utilization of a hydrogen source which is easily stored. Hydrogen, although a unique fuel which does not produce carbon dioide, sulphur dioxide or other undesirable hydrocarbon or particulate emissions on burning, is difficult and expensive to store for both fuel and non-fuel applications. Many conventional hydrogen production facilities produce hydrogen which must then be stored in expensive containers. The highly flammable nature of hydrogen creates additional problems in terms of on site storage both where produced and where used, and particularly during transportation because of safety considerations.

SUMMARY OF THE INVENTION

According to the instant invention, a process is provided for producing hydrogen or electricity as well as calcium sulphate from calcium sulphite wherein sulphur dioxide produced during the processing steps is employed for dissolving the calcium sulphite and subsequently used for the production of hydrogen or electricity. The sulphuric acid produced during the processing steps may be used for dissolving the calcium sulphite. The calcium sulphite may be derived from the solid waste produced in scrubbing sulphur dioxide in flue gas desulphurization operations such as the commercially used dual alkali process. When this process is used, the sulphite may contain also some appreciable quantities of both calcium carbonate and calcium sulphate as well as minor amounts of flyash material or other inert material.

The calcium sulphate may be produced in the form of calcium sulphate hemihydrate. Further the calcium sulphate hemihydrate may be produced in the form of very high purity crystals containing less than one percent of total impurities, excluding free water, and wherein iron is undetectable by regular analytical techniques. The total impurities in the calcium sulphate hemihydrate crystals produced from other less desirable sources, may be less than two percent, excluding free water.

The process comprises two stages of which the first stage has two steps which may comprise:
(a) adding a sufficient amount of either aqueous sulphur dioxide solution or sulphuric acid solution to the waste solid produced in flue gas desulphurization processes to dissolve all or the major portion of the contained calcium sulphite, calcium carbonate and calcium sulphate and subjecting the resultant solution to solid-liquid separation techniques to remove any solid residue and
(b) adding a sufficient amount of sulphuric acid solution in the second Step for treating the clear solution from Step ONE to crystallize all of the dissolved calcium as calcium sulphate hemihydrate, resulting in the evolution of sulphur dioxide gas which may or may not contain some carbon dioxide, dependent upon how the first step is performed, as well as some water vapour, and the second stage may comprise of either;
(i) a water electrolysis stage wherein the sulphur dioxide evolved in the second step of the first stage is used to produce an electrolyte consisting of a mixed sulphurous acid and sulphuric acid solution, the electrolysis step producing hydrogen gas in the cathodic section and sulphuric acid in the anodic section, these sections being separated by a membrane such that the sulphuric acid solution produced is recycled to the first stage of the process and the hydrogen is used for any number of commercial applications or
(ii) the sulphur dioxide can be fed to fuel cells to produce electricity.

The calcium containing waste product may be transported from the points of its generation to the points where it can be most economically utilized, preferably chiefly by water transport. The carbon dioxide generated may be vented off harmlessly. The evolved sulphur dioxide produced may be used for generating hydrogen or electricity or a portion of the evolved sulphur dioxide may be used as such in the marketing area, or by suitable liquification techniques to separate contained water vapour and carbon dioxide, the latter if present.

Alternatively, hydrogen and/or electricity may not be produced, but the sulphur dioxide evolved may be marketed as such in gasous or liquid form along with the calcium sulphate hemihydrate by-product.

According to a further embodiment of the instant invention, a process for producing sulphur dioxide and calcium sulphate from waste solids comprises the steps of:
(a) adding a sufficient amount of sulphuric acid or an aqueous sulphur dioxide solution to a waste solid containing calcium sulphite and other calcium salts to solubilize said calcium sulphite and other calcium salts;
(b) subjecting the product of step (a) to solid-liquid separation to obtain a solid phase and a liquid phase;
(c) adding a sufficient amount of sulphuric acid to crystallize calcium in said liquid phase as calcium sulphate and evoke a gas rich in sulphur dioxide and
(d) subjecting the product of step (c) to solid-liquid separation if and as necessary to separate out any solid residue.

The waste solids may be those produced in commercialized dual alkali flue gas desulphurization operations. Further, the amount of aqueous sulphur dioxide solution or sulphuric acid solution added in step (a) may lower the pH of said solution to a range from about 2.5 to about 3 and the amount of sulphuric acid added in step (c) may be sufficient to lower the pH of the liquid phase to about 1.8.

The process of step (a) may be conducted at a temperature from about 20° to about 85° C., and the temperature of the liquid phase during step (c) may preferably be about 40° to 65° C. and, the temperature of the liquid phase during step (c) may be about 25° to 35° C. if calcium sulphate dihydrate is preferred.

The calcium sulphate which is produced may be calcium sulphate hemihydrate, calcium sulphate hemihdyrate crystals in the beta crystal form, calcium sulphate hemihydrate crystals in the alpha crystal form or calcium sulphate dihyrate salt.

In this invention, the source of the hydrogen is a non-explosive, non-hazardous solid. Thus the handling and transportation of the hydrogen source is considerably easier, safer and less complex than the transfer of hydrogen to off site locations. The above considerations also apply to a lesser extent to the sulphur dioxide produced in the process.

These and other advantages of the instant invention will be more fully understood and explained by reference to the embodiments of the instant invention and the following drawings in which.

PREFERRED EMBODIMENT

Figure 1:
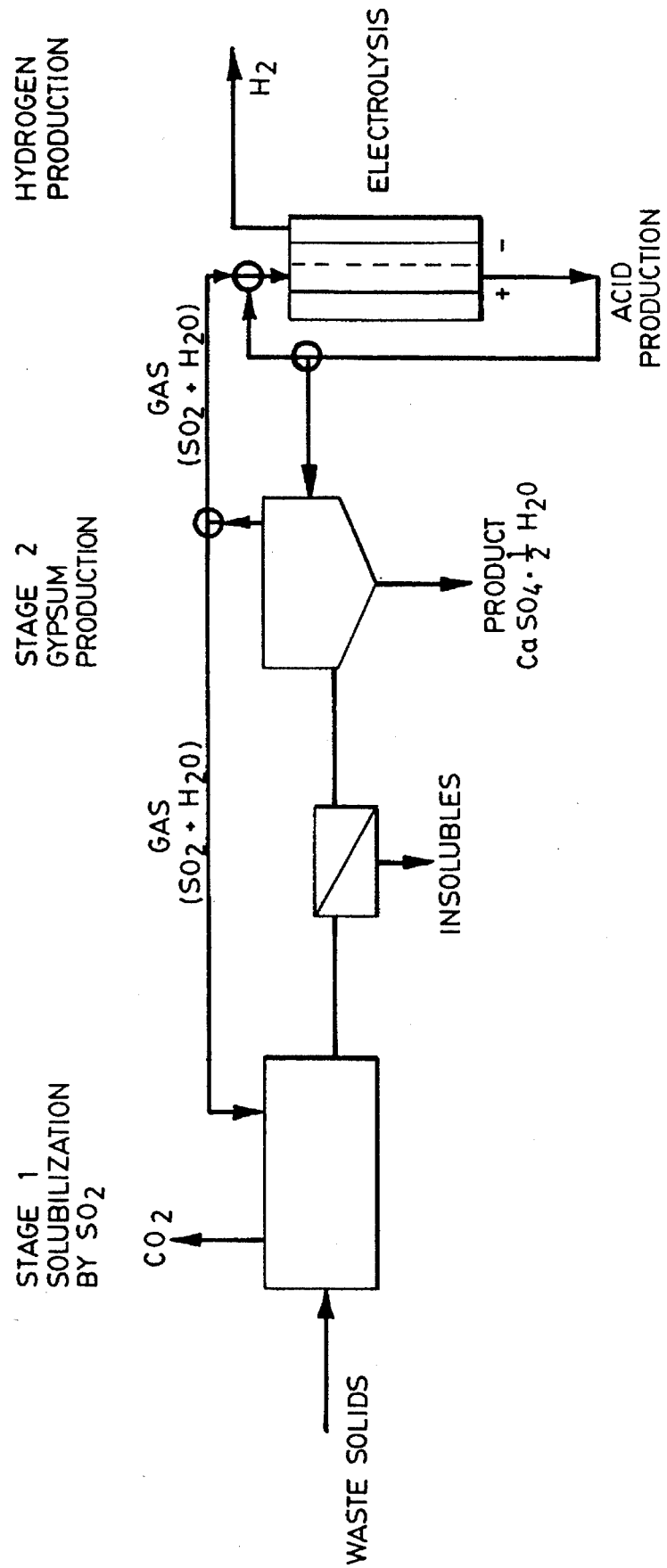
FIG. 1 is a flow sheet for the preferred embodiment of the instant invention.
Figure 2:
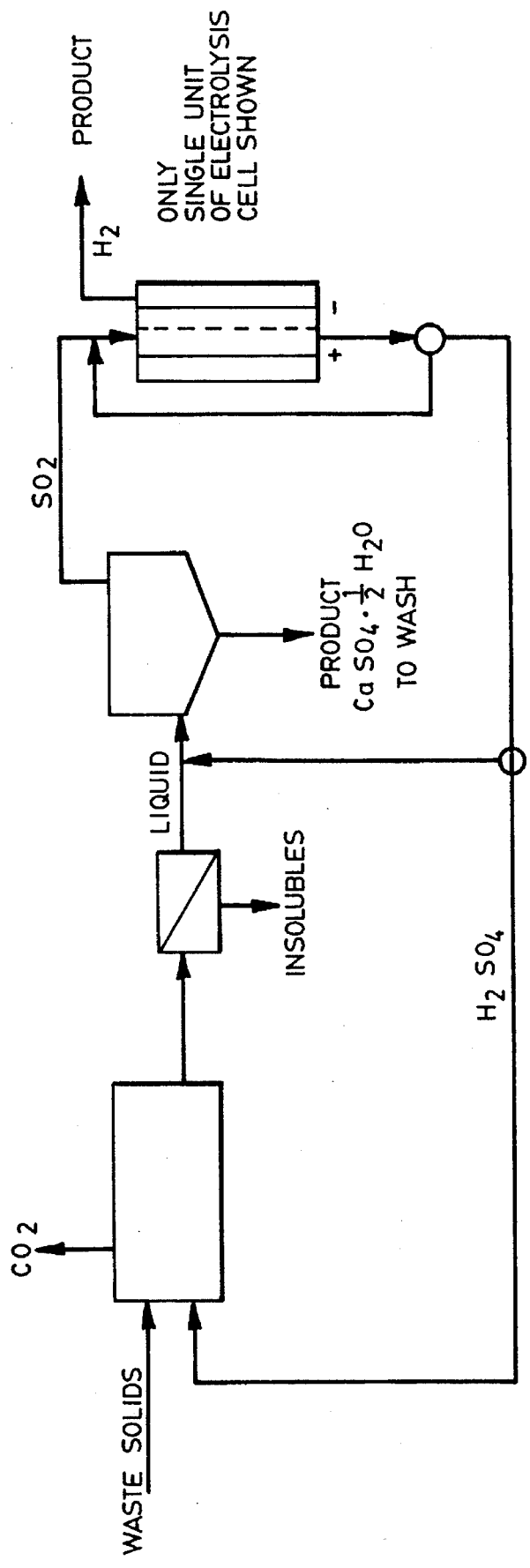
FIG. 2 is a flow sheet for a second embodiment of the instant invention.

According to the preferred embodiment of the instant invention, a waste solid containing a sulphite, preferably calcium sulphite or calcium sulphite salt is treated in a two stage process with acid to produce hydrogen and calcium sulphate.

The feed stock for the instant process may be any source of calcium sulphite or calcium sulphite salt. Preferably, the feed stock comprises solid wastes from flue gas scrubbing operations. These materials are particularly desirable as the instant process permits these waste materials to be converted into useful commercial products. Thus, the need to dispose of solid waste from flue gas scrubbing operations is alleviated.

According to the first stage of the instant process, the calcium sulphite and calcium sulphate and carbonate is solubilized by an aqueous sulphur dioxide solution or by sulphuric acid. The amount and concentration of the aqueous sulphur dioxide solution and/or sulphuric acid which is utilized are adjusted so that the pH of the solubilized stream is in the range of from about 3 to about 2.5. If an aqueous sulphur dioxide solution is preferred, the solid may be solubilized by placing the material containing calcium sulphite in water and sparging with sulphur dioxide while agitating the mixture.

Preferably, the rate ratio of dry calcium sulphite to water is less than 1:30. The first step may occur at a temperature from about 20° to about 85° C. and, preferably, from about 25° to about 45° C.

The undissolved solids, which may contain flyash and other inert materials are separated from the liquid by a solid-liquid separation stage. The solid-liquid separation may occur by any means known in the art and may include settling and decantation, filtration or flotation.

The gas given off in the first step will contain carbon dioxide if the waste solids contain carbonated salts. Flue gas desulphurization solids may contain from about 2 to about 20 weight percent calcium carbonate and, accordingly, when such feed stocks are used in the instant invention, carbon dioxide will be produced. The carbon dioxide may be combined with the sulphur dioxide obtained from the second step of the instant process if the presence of carbon dioxide is acceptable in the resultant sulphur dioxide process. Alternately, a simple water scrubber or a liquid gas contactor may be used to effect the separation of the carbon dioxide produced in this step from the sulphur dioxide. Alternatively, if sulphuric acid is used in this first step, the gas given off at this stage will contain carbon dioxide and water vapour which may be vented to the atmosphere.

The liquid phase from the aforementioned solid-liquid separation is subjected to a second step treatment. In this second step, sulphuric acid is added to the liquid phase produced in the first step to bring the pH to about 1.8 or lower. The temperature may vary from about 40° to about 80° C. Preferably, the temperature in this step should be about 65° C. to facilitate the release of sulphur dioxide from the solution and to cause the formation of a high quality calcium sulphate hemihydrate. No impurities were detected (ie. totalling less than 1 percent) in the crystalline products produced from the industrial waste samples.

The conditions of stirring and temperature will affect the calcium sulphate crystal size resulting in the formation of alpha or beta crystals of calcium sulphate hemihydrate. More rapid stirring will favour smaller crystal size. Temperatures below about 30° C. will favour the formation of calcium sulphate dihydrate salt.

The sulphur dioxide evolved in the second step treatments may be utilized in any suitable manner. Preferably, as shown in FIG. 1, a recycle stream of a portion of the sulphur dioxide produced from this second step operation is used as a chemical feed stock for the first step operation. Alternatively, sulphuric acid may be used which may be fresh acid or as recycled from the laser production of hydrogen. The sulphur dioxide is ultimately consumed in a sulphur dioxide electrolysis cell for hydrogen and sulphuric acid production.

As set out above, the second step results in the production of a liquid solution containing calcium sulphate solids. The mixture is subjected to solid-liquid separation. The solid calcium sulphate may be washed to remove adhering solution. This wash water and the step two solution may be reused as the solubilization solution for the feed stock. There is a net consumption of sulphuric acid over all which corresponds to the amount of sulphites and carbonates in the original waste material. In the industrial samples tested, the consumption ranged from 0.64 to 0.68 tons per ton of dry sample and the sulphur dioxide production correspond to 0.38 to 0.35 tons per ton of dry sample. When the instant invention is used in the preferred mode the sulphur dioxide produced in step two is used in an electrolysis cell to produce hydrogen and sulphuric acid. This sulphuric acid is sufficient for almost all of the acid required in step two.

As state above, the sulphur dioxide produced during the process may be used directly in other chemical applications since the sulphur dioxide only has carbon dioxide and water vapour as contaminants. Alternatively, the sulphur dioxide may be converted to low energy cost hydrogen in a sulphur dioxide electrolysis cell. The cell with a minimum of input energy produces clean hydrogen, a valuable fuel and a chemical feed stock. Importantly the cell also produces relatively high strength acid for the solubilization and conversion of the flue gas scrubbing solids.

The preferred route for using the sulphur dioxide electrolysis cell is to dissolve the sulphur dioxide released from the second step sulphuric acid stage into an electrolyte for the electrolysis cell. This route eliminates dissolved impurity carry-over into the electrolysis unit. The carbon dioxide accompanying the sulphur dioxide is poorly soluble in the acid electrolyte and can be harmlessly vented to the atmosphere. The electrolyte becomes a combination of sulphurous and sulphuric acids and may contain catalytic agents as demanded by the desired current density for the electrolysis cell. The cell uses a barrier to separate the anode and cathode compartments allowing isolation of the hydrogen produced in the cathode from the sulphur dioxide and carbon dioxide in the anode compartment. The barrier may be a simple porous membrane or, more preferably, an ionic membrane, to isolate the sulphur species to the anode compartment. Since this electrolysis cell uses the conversion of sulphurous acid to sulphuric acid there is a substantial energy reduction in the cost of hydrogen production compared to standard water electrolysis. With standard water electrolysis, oxygen must be displaced from water and this requires a high voltage and, except in unusual circumstances, results in a product (oxygen) which has no commercial value and must be vented. The sulphur dioxide cell produce hydrogen and sulphuric acid. Such electrolytic cell configurations are known (see of example U.S. Pat. No. 3,888,750) and substantial voltage reductions can be achieved. Commerical water electrolysis operations operate from 1.35 to 1.85 V. The sulphur dioxide cell can operate from 0.65 to 0.9 V depending on the required current density.

It will be apparent to those skilled in the art that various modifications and alternations of the process, such as the use of by products, such as evolved gases, production of sulphuric acid, and the recylcing of these products are within the scope of the instant invention.

EXAMPLE #1

A wet sample from a commercial utility flue gas scrubbing solid was used. In order to track conversion efficiency the sample was first dried to determine the mass and composition of the solid. The amount of calcium sulphate hemihydrate and the amount of insoluble fraction in the sample was determined by procedure 1. The amount of calcium sulphite in the sample was determined by procedure 2. The amount of calcium carbonate in the sample was calculated by difference of the calcium sulphite, calcium sulphate and insoluble material from the total sample weight taking into account the correct water of hydration of the sulphite and sulphate salts. Accordingly, the sample comprised 11.89% calcium carbonate, 69.67% calcium sulphite, 18.31% calcium sulphate and 0.13% insoluble material.

In the first step, a sufficient quantity of sulphuric acid (1.0N) was added to a slurry of the sample containing 3 grams of sample and 150 grams of water at room temperature. The pH was first reduced to about 2.5 at which level the solution had clarified because all of the components (except the insoluble material) were dissolved. In the second step and after suitable liquid-solid separation, sufficient 1.0N sulphuric acid was added to the liquid portion to bring the pH to 1.87 and sulphur dioxide and carbon dioxide were evolved. A total of 55 ml of 1.0N sulphuric acid was used in the two stages.

The solution was heated and sparged with nitrogen to speed the release of sulphur dioxide and carbon dioxide. These gases were trapped in an alkaline solution and the sulphur dioxide content determined by procedure 2. A total of 1.044 grams of sulphur dioxide was found representing a quantitative yield of sulphur dioxide. The heating and removal of sulphur dioxide from the solution resulted in the precipitation of gypsum. An EDX analysis of the gypsum solid showed only calcium sulphate hemihydrate with impurities <1000 ppm.

Thus for this sample, 0.348 tons of sulphur dioxide could be recovered per ton of dry solid with the use of 0.666 tons of 96.7% sulphuric acid. The amount of calcium sulphate hemihydrate produced would be 1.107 tons.

EXAMPLE #2

Another wet sample of a flue gas scrubbing solid from the same commercial utility was used as in Example 1. In order to track conversion efficiency the sample was first dried to determine the mass and composition of the solid. The amount of calcium sulphate hemihydrate and amount of insoluble fraction in the sample was determined as set out in Example 1. The amount of calcium sulphite in the sample was determined as set out in Example 2. The amount of calcium carbonate in the sample was calculated by difference of the calcium sulphite, calcium sulphate and insoluble material from the total sample weight taking into account the correct water of hydration of the sulphite and sulphate salts. The sample comprised 13.96% calcium carbonate, 69.42% calcium sulphite hemihydrate, 16.37% calcium sulphate and 0.25% insoluble material.

In step one, sufficient sulphuric acid (1.0N) was added to a slurry of the sample containing 3 grams of sample and 150 grams of water at room temperature. The pH was first reduced to 2.5 at which level the solution had clarified because all of the components (except the insoluble material) were dissolved. In step two, after suitable liquid solid separation additional acid was used to bring the pH to 1.87 and sulphur dioxide and carbon dioxide were evolved. A total of 55 ml of 1.0N sulphuric acid was used in the two steps. The solution was heated and sparged with nitrogen to speed the release of sulphur dioxide and carbon dioxide. These gases were trapped in an alkaline solution and the sulphur dioxide content determined as set out in Procedure 2. A total of 1.057 grams of sulphur dioxide was found representing a quantitative yield of sulphur dioxide from the calcium sulphite portion of the sample. The heating and removal of sulphur dioxide from the solution also resulted in the precipitation of calcium sulphate hemihydrate.

Thus for this sample, 0.352 tons of sulphur dioxide could be recovered per ton of dry solid with the use of 0.683 tons of 96.7% sulphuric acid. The amount of calcium sulphate hemihydrate produced would be 1.116 tons.

EXAMPLE #3

A dry sample of a flue gas scrubbing solid from a different commercial utility was used. The amount of calcium sulphate hemihydrate and amount of insoluble fraction in the sample was determined as set out in Example 1. The amount of calcium sulphite in the sample was determined as set out in Example 2. The amount of calcium carbonate in the sample was calculated by difference of the calcium sulphite, calcium sulphate and insoluble material from the total sample weight taking into account the correct water of hydration of the sulphite and sulphate salts. The sample comprised 3.62% calcium carbonate, 76.85% calcium sulphite, 19.02% calcium sulphate and 0.51% insoluble material.

In step one, sufficient sulphuric acid (1.0N) was added to a slurry of the sample containing 3 grams of sample and 150 grams of water at room temperature. The pH was first reduced to about 2.5 at which level the solution had clarified because all of the components (except the insoluble material) were dissolved. In step two, after suitable liquid solid separation additional acid was used to bring the pH to 1.87 and sulphur dioxide and carbon dioxide were evolved. A total of 55 ml. of 1.0N sulphuric acid was used in both stages. The solution was heated and sparged with nitrogen to speed the release of sulphur dioxide and carbon dioxide. These gases were trapped in an alkaline solution and the sulphur dioxide content determined as set out in procedure 2. A total of 1.144 grams of sulphur dioxide was found representing quantitative yield of sulphur dioxide. The heating and removal of sulphur dioxide from the solution also resulted in the precipitation of calcium sulphate hemihydrate.

Thus for this sample, 0.381 tons of sulphur dioxide could be recovered per ton of dry solid with the use of 0.640 tons of 96.7% sulphuric acid. The amount of calcium sulphate hemihydrate produced would be 0.972 tons.

EXAMPLE #4

A dried industrial waste sample was used (another portion of the stock material used in Example #1). In step one, sulphur dioxide was sparged into a stirred slurry of 3 g. of sample in 150 g. water. When the pH reached 2.45, the solution became clear showing that the sample was solubilized. This process was accomplished more quickly than in Example #1. At this point, the separation of insolubles such as flyash could be carried out though this operation was not performed in this example. In step two, sulphur dioxide sparging was terminated and addition of the sulphuric acid was begun with gentle heating of the solution to 50° C. Evolution of sulphur dioxide was observed. Acid addition was terminated at a pH of 1.87. The precipitation of calcium sulphate was observed. Crystllographic inspection of the precipitate revealed the solid to be the hemihydrate form.

PROCEDURE #1

The purpose of this test is to calculate the amount of $CaSO_4$, ½ $H_2O$ and insoluble fraction present in the sample. The sample is attacked with solution HCl (1N) and $SO_2$ and $CO_2$ are evolved from the reaction of $CaSO_3$ and $CaCO_3$ with HCl. $CaSO_4$ becomes soluble and the solution is heated in order to get rid of gases and then is filtered, and the solids are dried and weighed to determine the mass of insoluble fraction. A solution of $BaCl_2$ (11 g/l) is added to the filtered solution to precipitate $BaSO_4$. The new solution is heated and then filtered. The precipitate is weighed according to ASTM C25–87 to determine the sulphate content.

Calcium Sulphate can be calculated as follows:

g $CaCO_4.H_2O$=(g $BaSO_4$ obtained * 0.6318155

PROCEDURE #2

In this procedure, the purpose is to determine the amount of $CaSO_3$ present in the sample. First of all, the sample is oxidized for 24 hrs. with $H_2O_2$ in order to oxidize $CaSO_3$ to $CaSO_4$, and then the procedure of Experiment 1 is followed. Calcium sulphite can be calculated as follows:

g $(CaSO_4.½H_2O)$oxidation=[(g $BaSO_4$)exp.2− (g $BaSO_4$)exp.1] *0.6219155 g $(CaSO_3,½H_2O)$=0.8897727 * (g $(CaSO_4,½ H_2O)$oxidation)

PROCEDURE #3

The acidified solution is heated in order to get rid of $SO_2$ and is sparged with nitrogen for 48 hrs. $SO_2$ and $CO_2$ are trapped in NaOH solution (0.5N), where sodium carbonate and sodium sulphite are formed. Hydrogen peroxide (50%) is used to oxidize sodium sulphite to sodium sulphate and then hydrochloric acid is added to get rid of $CO_2$ by the reaction of sodium carbonate. Barium chloride (100 g/l) is added to the solution to precipitate barium sulphate.

Sulphur dioxide can be calculated as follows:

g $SO_2$(evolved)=0.2744874 * (g $BaSO_4$ (obtained))

We claim:

1. A process for producing hydrogen as well as calcium sulphate hemihydrate from a substance containing calcium sulphite, said process comprising first and second stages, said first stage comprising the steps of:
   1. adding a sufficient amount of at least one of sulphur dioxide and sulphuric acid solution to said substrate to dissolve at least some of said contained calcium sulphite and form a resultant solution;
   2. separating said resultant solution from any undissolved portion of said substance;
   3. adding a sufficient amount of sulphuric acid to said resultant solution to form a precipitate of calcium sulphate hemihydrate and sulphur dioxide gas;

and said second stage comprising the further step of;
   4. dissolving at least some of said sulphur dioxide from step 3 in an electrolyte;
   5. introducing said electrolyte from step 4 into an electrolytic cell having an anode and a cathode;
   6. electrolyzing said electrolyte to produce hydrogen and sulphuric acid.

2. A process according to claim 1 wherein:
   said electrolytic cell includes a barrier separating said anode and said cathode to form respective anode and cathode compartments;
   said barrier isolating hydrogen produced in said cathode compartment from any sulphur dioxide and carbon dioxide formed in said anode compartment.

3. A process according to claim 2 wherein said barrier is an ionic membrane which isolates sulphur species to said anode compartment.

4. A process according to claim 2 or 3 wherein the sulphuric acid produced in step 6 is used as at least part of the sulphuric acid in step 3.

5. A process according to claim 1, 2 or 3 wherein said substance comprises solid waste from a dual alkali flue gas desulphurization operation.

6. A process according to claim 2 or 3 wherein said sulphuric acid produced in step 6 is used as at least part of the sulphuric acid in step 3 and said substrate comprises solid waste from a dual alkali flue gas desulphurization operation.

7. A process according to claim 1, 2 or 3 wherein said sulphuric acid or aqueous sulphur dioxide solution added in step 1 loweres the pH of said resultant solution to a range from about 2.5 to about 3 and the amount of sulphuric acid added in step 3 is sufficient to lower the pH of any liquid phase to about 1.8.

8. A process according to claim 2 or 3 wherein sulphuric acid produced in step 6 is used as at least part of the sulphuric acid in step 3, the sulphuric acid lowers the pH of said resultant solution to a range from about 2.5 to about 3 and the amount of sulphuric acid added in step 3 is sufficient to lower the pH of any liquid phase to about 1.8.

9. A process according to claim 1, 2 or 3 wherein:
   said substance comprises solid wastes from a dual alkali flue gas desulphurization operation, said solid waste containing calcium sulphite and other calcium salts;
   said sulphuric acid produced in step 6 is used as at least part of the sulphuric acid in step 3;
   said sulphuric acid or sulphur dioxide solution added in step 1 dissolves at least some of said other calcium salts into said resultant solution;
   said sulphuric acid or aqueous sulphur dioxide solution added in step 1 lowers the pH of said resultant solution to a range from about 2.5 to 3; and
   the amount of sulphuric acid added in step 3 is sufficient to lower the pH of any resulting solution to about 1.8.

10. A process according to claim 1, 2 or 3 wherein:
    step 3 is carried out at a temperature of 85° C.

11. A process according to claim 1, 2 or 3 wherein:
    step 3 is carried out at a temperature from about 80° C. to about 90° C.

12. A process according to claim 1, 2 or 3 wherein:
    the sulphuric acid produced in step 6 is used as at least part of the sulphuric acid in step 3; and
    step 3 is carried out at a temperature from about 70° C. to about 105° C.

13. A process according to claim 1, 2 or 3 wherein:
    the sulphuric acid produced in step 6 is used as at least part of the sulphuric acid in step 3;
    step 1 is carried out at ambient temperature and the resultant solid is mainly calcium sulfate dihydrate.

14. A process according to claim 1, 2 or 3 wherein a portion of the sulphur dioxide produced in step 3 is fed to a fuel cell to produce electricity.

15. A process according to claim 2 wherein the sulphur dioxide gas produced in step 3 is captured for subsequent use.

16. A process for producing electricity as well as calcium sulphate hemihydrate from a substance containing calcium sulphite alone or in combination with other calcium salts said process comprising first and second stages, said first stage comprising the steps of:

1. adding a sufficient amount of at least one of sulphur dioxide and sulphuric acid solution to said substrate to dissolve said calcium sulphite and at least some of said other calcium salts if present to form a resultant solution;
2. separating said resultant solution from any undissolved portion of said substance;
3. adding a sufficient amount of sulphuric acid to said resultant solution to form a precipitate of calcium sulphate hemihydrate and sulphur dioxide gas;

and said second stage comprising the further step of:

4. feeding the sulphur dioxide produced in step 3 to a fuel cell to produce electricity.

17. A process according to claim 16 wherein said substance comprises solid waste from a dual alkali flue gas desulphurization operation.

18. A process according to claim 1, 2, 3 or 16 wherein said first stage includes the further step of separating said calcium sulphate hemihydrate precipitate from any liquid present.

19. A process according to claim 1, 2, 3, 16, 17 or 15 wherein the liquid portion of the product in step 3 is separated and utilized as part of the solution in step 1.

* * * * *